US012612545B1

(12) United States Patent
Almohsin et al.

(10) Patent No.: US 12,612,545 B1
(45) Date of Patent: Apr. 28, 2026

(54) BIO-COMPOSITE SEAL FOR WATER SHUT OFF APPLICATION IN A FRACTURED SUBSTRATE

(71) Applicant: Saudi Arabian Oil Company, Dhahran (SA)

(72) Inventors: Ayman M. Almohsin, Dhahran (SA); Tariq Abdulsattar Almubarak, Dhahran (SA); Mohammed I. Alabdrabalnabi, Al Qatif (SA); Ahmed A. Al Sulaiman, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/191,406

(22) Filed: Apr. 28, 2025

(51) Int. Cl.
| | |
|---|---|
| *E21B 33/138* | (2006.01) |
| *C04B 14/06* | (2006.01) |
| *C04B 18/24* | (2006.01) |
| *C04B 28/26* | (2006.01) |
| *C09K 8/504* | (2006.01) |
| *C09K 8/506* | (2006.01) |
| *C04B 103/00* | (2006.01) |

(52) U.S. Cl.
CPC ............ *C09K 8/506* (2013.01); *C04B 14/062* (2013.01); *C04B 18/248* (2013.01); *C04B 28/26* (2013.01); *C09K 8/5045* (2013.01); *E21B 33/138* (2013.01); *C04B 2103/0078* (2013.01); *C09K 2208/04* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 4,662,448 A | 5/1987 | Ashford et al. | |
| 2010/0193244 A1* | 8/2010 | Hoskins | C09K 8/516 |
| | | | 507/104 |
| 2018/0038224 A1* | 2/2018 | Brierley | E21B 43/26 |
| 2020/0190389 A1* | 6/2020 | Pernites | E21B 33/16 |

OTHER PUBLICATIONS

Almohsin et al., "A Nano Method for a Big Challenge: Nanosilica-Based Sealing System for Water Shutoff," presented at the SPE Middle East Oil & Gas Show and Conference, Dec. 2021, 6 pages.
Jadhav et al., "Coffee as a Cement Retarder," paper presented at the SPE Middle East Oil & Gas Show and Conference, Manama, Kingdom of Bahrain, Mar. 6-9, 2017, 10 pages (Abstract Only).
Le et al., "Strength characteristics of spent coffee grounds and oyster shells cemented with GGBS-based alkaline-activated materials," Construction and Building Materials, Jan. 2021, 267:120986, 16 pages.

(Continued)

*Primary Examiner* — Andrew Sue-Ako
(74) *Attorney, Agent, or Firm* — Dinsmore & Shohl LLP

(57) ABSTRACT

A bio-composite solution that includes crushed coffee waste, colloidal nanosilica, and an activator is injected into a fracture zone of a subterranean formation. The bio-composite solution is cured at a downhole temperature in the fracture space to form a rigid solid gel. The rigid solid gel is strengthened due to the presence of coffee waste in its matrix and can block water flow from an overlying aquifer zone through the fracture into a production well.

10 Claims, 5 Drawing Sheets

(56)                      References Cited

OTHER PUBLICATIONS

Madu et al., "Feasibility study of biodegradable coffee ground waste and watermelon rind as water-based drilling fluid additives," Gas Science and Engineering, Apr. 2024, 125:205322, 14 pages.
Salem et al., "Use of Cellulosic Esters Derived from Coffee Ground Wastes as Sorbent Material for the Purification of Produced Water from Kuwaiti Oil Extraction Operations," paper presented at the International Petroleum Technology Conference, Dhahran, Saudi Arabia, Feb. 12, 2024, 2 pages (Abstract Only).

* cited by examiner

BIO-COMPOSITE SEAL FOR WATER SHUT OFF APPLICATION IN A FRACTURED SUBSTRATE

TECHNICAL FIELD

This disclosure relates to methods of producing a composite for water shut off applications in hydrocarbon production operations.

BACKGROUND

Oil-bearing reservoirs in a subterranean formation include crude oil, formation water, and dissolved gases. Crude oil extraction from the reservoir includes a primary production process in which crude oil is produced through a production well by a reservoir's natural pressure drive. After the reservoir experiences a pressure depletion, a secondary production process is performed by injecting an external agent, such as gas or water, into the reservoir through an injection well to sweep crude oil in the reservoir towards the production well. After a certain period of continued crude oil extraction, more formation water from the reservoir begins to be swept into the production well resulting in an increase in the formation water being produced.

SUMMARY

Implementations described here provide a method for producing a bio-composite seal for water shut off applications in hydrocarbon production operations.

DETAILED DESCRIPTION

Figures 1A, 1B:
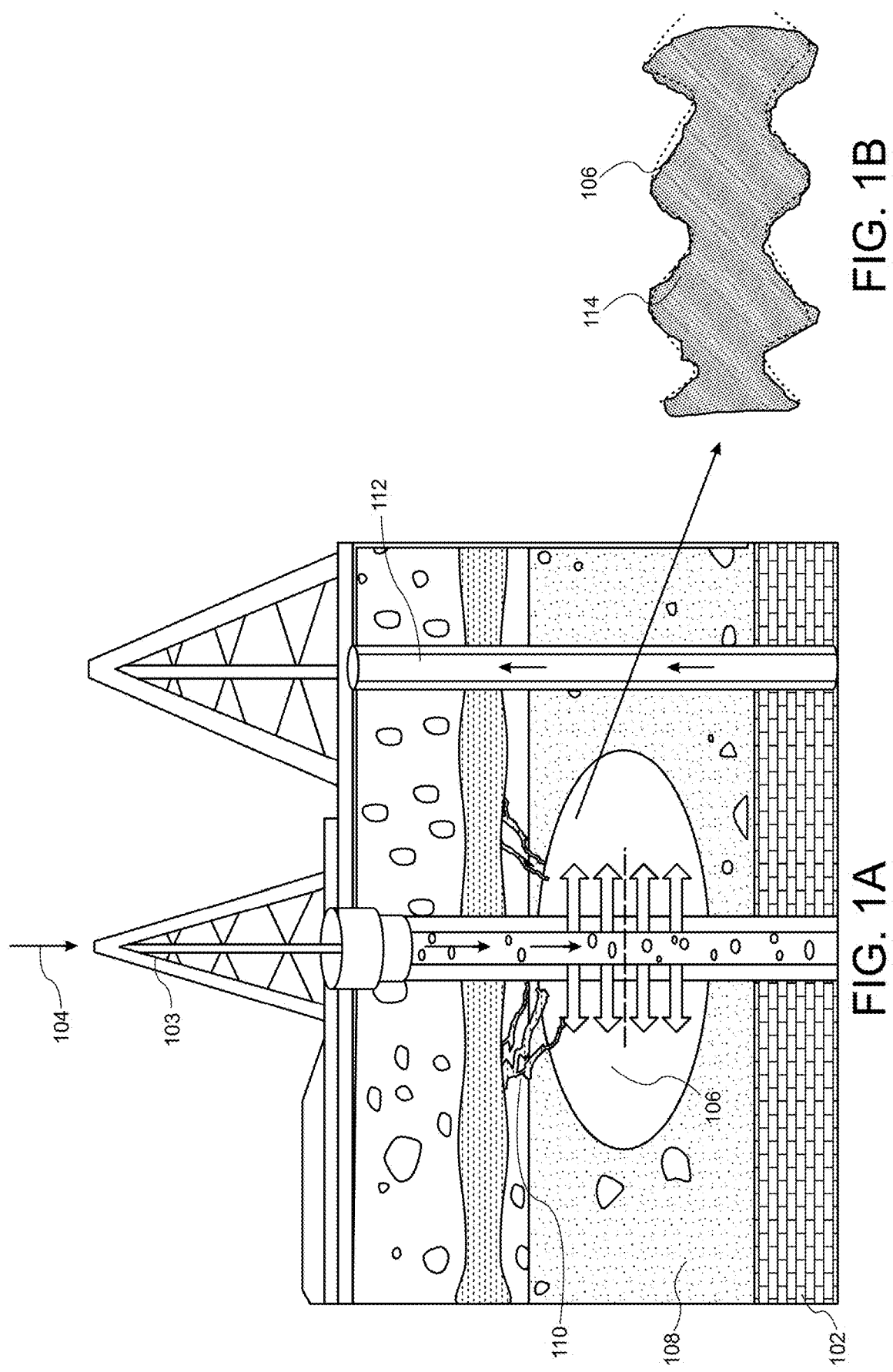
FIG. 1A is a schematic representation of the injection of a composite solution through a well into a fracture zone.
FIG. 1B is a cross section view of a fracture channel with the bio-composite sealant.

Mature oil fields often experience a high water production. When wells (e.g., extended horizontal wells, extended vertical wells, and multilateral wells) are drilled through mature oil fields for further crude oil recovery, the wells can encounter multiple fractures, high permeability streaks, or faults. In some mature oil fields, fractures can be naturally present, while in other fields, fractures can be created by man-made operations. In addition to fractures, some fields include vugs (empty spaces).

A fracture is highly conductive to fluid flow as it has high permeability, which is orders of magnitude higher than that of the surrounding reservoir rock. Therefore, these conductive fractures offer lesser resistance to fluid flow when compared to the reservoir rock. In some fields, in addition to the high permeability of the fracture, the fracture can be connected to an overlying aquifer zone. When a production well is operated in such fields, water from the aquifer zone can flow through the fracture into the production well along with oil and formation water, resulting in more water than desired in the produced fluids. In such cases, selective well completion can be used to isolate the water producing zones and target the oil-producing zones.

A well completion is a series of operations performed to prepare a wellbore for reservoir fluids production. The well completion operation includes installing a casing in a wellbore, perforating the reservoir rocks, and setting a production tubing string through the casing into the wellbore. The reservoir fluids flow into the production tubing string to the surface. Selective well completion is a process in which oil producing zones of the reservoir are selectively perforated, avoiding the perforations of the water producing zone.

Most production wells, which are installed in the subterranean formation that include fractures and high permeability streaks, experience premature water breakthrough. Methods to minimize water production from fractures and high permeability streaks include chemical injection techniques. Identifying the right chemical injectant that is thermally stable and has a long term mechanical integrity under reservoir conditions can prevent premature water breakthrough into the production well.

Implementations disclosed here provide a composition and a method for forming a bio-composite sealant for use in water shut off applications in a heterogenous porous media. The bio-composite sealant includes crushed porous coffee waste, a colloidal nanosilica, and an activator. The colloidal nanosilica reacts with the activator to form a solid gel under high temperature and an optimal activator concentration. The solid gel formation can occur at a temperature range of 150-350 Fahrenheit (° F.), which is the temperature range at downhole conditions within a subterranean zone where a wellbore is drilled. The crushed granular coffee can reinforce the solid gel to have greater rigidity and mechanical strength. In some implementations, crushed coffee waste is treated and acts as a filler in the bio-composite sealant. Further, the crushed granular coffee is water absorbent, providing a strong seal for water shut off applications. The disclosed bio-composite sealant reduces chemical waste by reusing spent coffee grounds as the porous coffee waste. Further, the environmental impact caused by the use of chemicals can be reduced as well.

FIG. 1A is a schematic representation of the injection of a bio-composite solution through a well into a fracture zone and FIG. 1B is a cross sectional view of a fracture channel with the bio-composite sealant. Two wellbores are formed in a subterranean zone 102. One of the wellbore includes an injection well 103 and the other wellbore includes a production well 112. A well can be oriented vertically or a portion of the well can be oriented horizontally by drilling the well at a deviated angle.

A bio-composite solution 104, which includes crushed granular coffee waste (hereafter referred to as coffee waste), a colloidal nanosilica, and an activator is injected through a pump into the wellhead of the injection well 103. The bio-composite solution 104 is injected at a flow rate such that it reaches the target depth at a desired time after injection. For example, the bio-composite solution 104 is injected at a flowrate of 0.2-1 barrel/minute (bbl/min) (0.0005-0.002 m³/s). The flow rate can be varied depending on the injectivity (case of flow) into the fracture. The injectivity depends on factors such as depth, permeability, and porosity. If multiple fractures are present at different depths, a coiled tubing and packers are used to selectively place the bio-composite solution 104 into the fractures. The selective placement of the bio-composite solution 104 into the fractures ensures that the bio-composite solution 104 is not lost into the surrounding reservoir zone.

After injection, the bio-composite solution 104 flows into a target zone 106 of an oil-bearing reservoir 108 due to the higher permeability of the target zone 106 when compared to the permeability of the oil-bearing reservoir 108. The high permeability of the target zone 106 offers less resistance to flow (less pressure to overcome for flow) when compared to the surrounding reservoir.

The target zone 106 can include a fracture connected to an aquifer zone 110. In some implementations, the target zone 106 includes faults, vugs, and high permeability streaks. The geological characteristics of an oil field, such as oil producing zones, presence of fractures, faults, high permeability streaks, vugs, aquifer zones connected to fractures or high permeability streaks, and the depth at which these fractures, faults, and high permeability streaks is present, are identified using seismic data and well logging data. To identify the presence of fractures, several logs such as production logs or image logs are used.

After the identification of a fracture from the production logs or image logs, an injectivity test is conducted using a live coil tubing. A live coil tubing is a long and flexible pipe that can convey fluids. The live coil tubing is equipped with pressure and temperature sensors. When the pressure sensor detects a minimal increase in pressure during flow of a fluid through the live coil tubing, it indicates the presence of the fracture. In other words, in the fracture, the pressure of injection remains low. In addition, the temperature sensors detect the temperature of the injected fluid through the fracture, resulting in the determination of the cooling effect of the fluid during flow. In this case, the temperature measurements help in determining the setting time (also referred to as curing time) of the bio-composite solution 104.

Once the bio-composite solution 104 reaches the target zone 106, the injection well 103 and production well 112 are shut off. This allows for curing the bio-composite solution 104 at the downhole conditions to form a solid gel 114 in the target zone 106. The curing time depends on the temperature and activator concentration.

The downhole temperature can range between 150-350° F. The solid gel 114 forms at the downhole temperature, where gel formation occurs due to the reaction between the colloidal nanosilica and the activator at the temperature range of 150-350° F. Gel formation can occur at a temperature below 150° F., for example at 100° F. At lower than 150° F., the activator concentration is increased up to a maximum concentration of 40 weight (wt) % to increase the speed of gelation. In some implementations, the activator concentration is adjusted such that gel formation does not occur during the flow of the bio-composite solution 104 towards the target zone 106. The solid gel 114 is interspersed with coffee waste to provide rigidity. Further, the time duration for the formation of the solid gel 114 depends on the activator concentration, in addition to the temperature. For example, the bio-composite solution 104 starts to form a solid gel 114 at a temperature of 150° F. and 25 wt % activator concentration. As the temperature increases, the activator concentration can be reduced. For example, an activator concentration of 12-15 wt % can be used at a temperature of 350° F. As the temperature and/or activator concentration increases, the curing time for the solid gel 114 formation decreases. To adjust the curing time of the bio-composite solution 104, the flow rate of the injected bio-composite solution 104 is adjusted. At higher flow rates, the interactions between the nanosilica and activator molecules increase, which result in faster gelation. A correlation between the depth of fracture, flow rate, activator concentration, and temperature is used to adjust the curing time.

As shown in FIG. 1B, the solid gel 114 has a rigid structure with a high viscosity. The solid gel 114 once formed does not flow. The solid gel 114 forms inside the target zone 106, shutting aqueous fluid flow, such as water from the aquifer zone 110, through the target zone 106. The formation of the solid gel 114 can be confirmed by an injectivity test, where a change in the pressure profile is measured. When a solid gel 114 is formed, a steep jump in pressure can be measured. In addition, logging tools such as production log and noise log can be used to determine the volume occupied by solid gel 114 and the integrity of the solid gel 114. The injectivity test and logging are performed before injecting the bio-composite solution 104 and after the formation of the solid gel 114. This provides a rigid sealant by occupying most of the volume of the target zone 106, such as the fracture volume. In some implementations, the solid gel 114 occupies about 70-100 volume % of the target zone 106.

After the solid gel 114 seals the target zone 106, water from the aquifer zone 110 that is connected to the target zone 106 cannot easily flow through the target zone 106 into the production well 112. The amount of water that flows from the aquifer zone 110 into the target zone 106 depends on the volumetric space available for water flow in the target zone 106. For example, if the rigid solid gel 114 seals more space in the fracture, less water from the aquifer zone 110 can flow through the gaps that is not filled with the solid gel 114.

The solid gel 114 is interspersed with coffee waste which is porous and will absorb some of the water flowing through the sealed target zone 106. After the formation of the solid gel 114, the coffee waste does not absorb more water. The water plugging efficiency is improved in the presence of the solid gel 114.

As water from the aquifer zone 110 does not flow into the production well 112, water is not produced through the production well 112. Therefore, the solid gel 114 functions as a bio-composite sealant for water shut off application. In some implementations, lesser water flows from the aquifer zone 110 through the target zone 106 (i.e., through the gaps in the sealed target zone) into the production well 112, than in cases where the bio-composite sealant is present. Once the production well 112 is turned on, hydrocarbons are produced, where dissolved gases and oil flow to the surface, with reduced water production from the target zone 106. The solid gel 114 is thermally stable and will remain in the target zone 106. The solid gel 114 can withstand temperatures up to 350° F.

Figure 2:
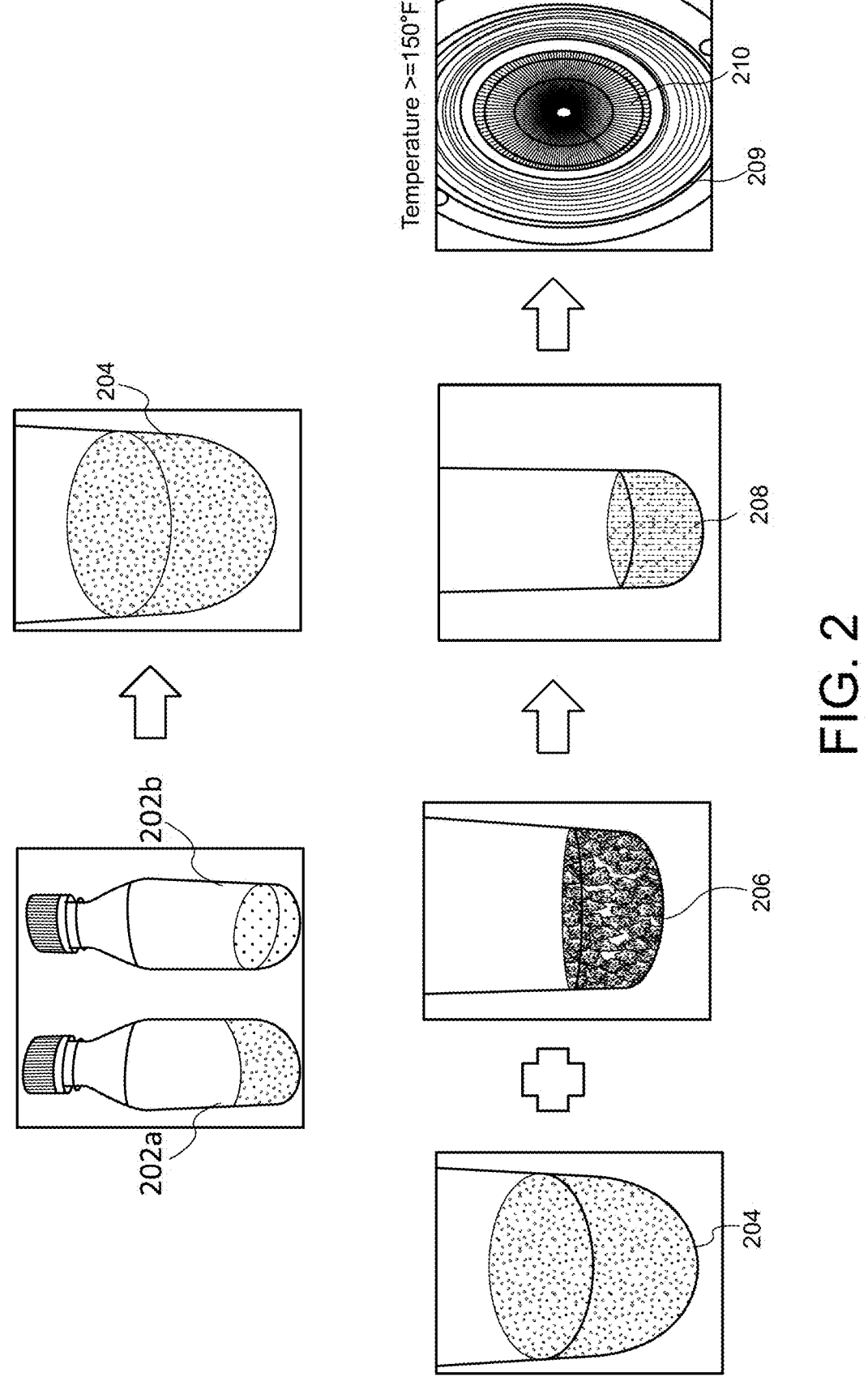
FIG. 2 represents the experimental preparation steps to form a composite sealant.

FIG. 2 represents the experimental preparation steps to form a bio-composite sealant. The bio-composite solution is formed by a mixture of colloidal nanosilica, activator, and coffee waste. Colloidal nanosilica is a stable dispersion of nano-sized silicon dioxide ($SiO_2$) particles suspended in water. The particles are evenly distributed and do not settle when in solution due to the size and surface charge of the particles.

The activator used for the bio-composite solution includes sodium silicate. In some implementations, the activator includes potassium chloride, sodium chloride, potassium silicate, sodium hydroxide, potassium hydroxide, potassium carbonate, ester containing compounds, and polymers with monomers such as methyl acrylate.

The coffee waste can include crushed coffee granules or spent coffee grounds. Coffee extraction from coffee beans account for only 20-30% of the total content. The remaining coffee beans are disposed as waste, also referred to as spent coffee grounds. Spent coffee grounds can be obtained from domestic use, commercial coffee brewing, or coffee processing plants. The size of the coffee waste is determined based on the size of the fracture into which the bio-composite solution is injected.

The colloidal nanosilica solution 202a is placed in a first glass bottle. The activator 202b is placed in a second glass bottle. The activator 202b from the second glass bottle is added to the colloidal nanosilica solution 202a and the two ingredients are mixed by stirring continuously using a magnetic stir bar to form a homogeneous mixture of colloidal nanosilica and activator 204. The mixing can also be done by placing the bottle that includes the mixture of colloidal nanosilica and activator 204 on a shaker. In some implementations, the concentration of the activator in the mixture of colloidal nanosilica and activator 204 is varied to adjust the curing time of the bio-composite solution 208.

To the mixture of colloidal nanosilica and activator 204, crushed coffee waste 206 (referred to as coffee waste) is added. The amount of crushed coffee waste 206 added depends on the strength of the bio-composite solution needed for the application. The strength needed can be determined by the reservoir pressure. The coffee waste 206 being porous, absorbs the mixture of colloidal nanosilica and activator solution 204, resulting in a bio-composite solution 208. The size of the coffee waste 206 depends on the size of the fracture into which the bio-composite solution 208 is being injected. In some implementations, the spent coffee grounds after brewing are used as the coffee waste 206. In some implementations, crushed date seed is added to the mixture of colloidal nanosilica and activator 204, in addition to coffee waste 206. The crushed date seeds offer strength to the nanosilica, as the seeds have a larger size compared to the crushed coffee waste 206. In addition, the crushed coffee waste and the date seeds help to reduce environmental waste.

At room temperature, the bio-composite solution 208 has a viscosity range such that it can flow. The viscosity of the bio-composite solution 208 at room temperature can range between 50-200 cP. The bio-composite solution 208 is subject to a temperature which allows it to cure, resulting in a solid gel 210. The temperature can range between 120-350° F. The minimum temperature needed for curing to form a solid gel 210 is based on the chemical properties of the colloidal nanosilica 202a and the activator 202b. The time take to form the solid gel is referred to as curing time. The curing time depends on the temperature and the concentration of the activator 202b.

For curing, the bio-composite solution 208 is poured into a cylindrical cell 209. The cylindrical cell 209 can be made of stainless steel alloy or ceramic material to withstand a high temperature range of 150-400° F. The cylindrical cell 209 can be surrounded by a heat jacket for temperature regulation. In some implementations, the cylindrical cell 209 is placed in an oven at a set temperature. The temperature is varied systematically to determine the minimum curing temperature. At the minimum curing temperature, the solid gel formation occurs. The time taken (curing time) to attain a solid gel 210 structure can be varied by increasing the temperature or increasing the activator 202b concentration. Example of Formation of a Bio-Composite Sealant A colloidal nanosilica solution 202a weighing 140 g was placed in a first glass bottle. The colloidal nanosilica solution 202a included a 40% active ingredient. In a second glass bottle, 60 g of sodium silicate solution (activator 202b) was placed. The sodium silicate solution included 30% active material. The colloidal nanosilica solution and sodium silicate solution was combined to form 200 g mixture of colloidal nanosilica and sodium silicate. The mixture of colloidal nanosilica and sodium silicate was placed in a third glass bottle and mixed using a Teflon magnetic stir bar. In some implementations, the third glass bottle was placed in a shaker for mixing.

The concentration of the sodium silicate solution was varied in the mixture of colloidal nanosilica and sodium silicate solution. For example, 25 wt %, 30 wt %, and 40 wt % of sodium silicate solution was added to the mixture of colloidal nanosilica and sodium silicate solution.

Coffee waste 206 of 200 g was added to the mixture of colloidal nanosilica and sodium silicate. The amount of coffee added depends on the strength of the gel needed for the application. The coffee waste 206 used was dry or moist. The size of the coffee waste 206 was varied between 200 micrometer to 5 mm. The size of the coffee waste 206 was selected based on the size of the fracture. When the mixture of nanosilica and sodium silicate was added to the coffee waste 206, the coffee waste 206 absorbed the solution, forming the bio-composite solution 208. The bio-composite solution 208 resulted in a high differential pressure, indicating a good plugging efficiency.

At room temperature, the bio-composite solution 208 had a viscosity such that it could flow, i.e., 50-200 cP. The mixture of nanosilica and sodium silicate had a viscosity of about 6 cP, before adding the coffee waste 206. The bio-composite solution 208 was placed in a cylindrical cell 209 for curing. The cylindrical cell 209 was equipped with a pressure gauge. The temperature for curing was varied systematically from 150-200° F. Experimental tests revealed that the bio-composite solution 208 cured in about 50 minutes at 200° F. and had a viscosity of more than 1000 cP. After curing, the bio-composite solution 208 was further cured for additional time to form a solid gel like structure. The additional time was approximately double the time of the initial gel formation. After about 3 hours, the cured bio-composite solution 208 retained a solid gel like structure. The activator concentration in the bio-composite solution 208 was 30 wt %.

After curing, the cylindrical cell 209 was cooled to room temperature and dismantled. Water was pressurized and flowed through the rigid solid gel 210 at room temperature to determine the plugging performance. It was found that the water did not pass through the rigid solid gel 210, as water was entrapped within the solid gel's network. This was further indicated by a pressure increase on the pressure gauge. It was further observed that the rigid solid gel 210 had a thermal stability over a temperature range of 150-350° F. Thermogravimetric analysis (TGA) was used to measure thermal stability. In a TGA measurement, the weight loss in the first region, between 25-300° C., can be assigned to the loss of moisture and light volatile hydrocarbon (HC) materials. The weight loss in the second region, between 300-600° C., can be assigned to the decomposition/evaporation of degradable inorganic ingredients.

After the formation of the rigid solid gel 210, a filter press test was conducted to evaluate the plugging efficiency of the rigid solid gel 210, using a plugging permeability apparatus. The plugging permeability apparatus is a device that is used to evaluate filtration properties of the rigid solid gel 210, especially the formation of a filter cake on a slotted disc. The slotted disc is used to simulate a fracture in downhole conditions. In this case, a 3 mm slotted disc was used to mimic a fracture having an aperture width of 3 mm. The filter cake formed on the surface of the slotted disc is used to evaluate the effectiveness of the seal or "plug." The plugging permeability device is operated under high pressure and high temperature, similar to downhole conditions in a wellbore. The temperature can be regulated using a heat jacket surrounding the apparatus.

Example of Filter Press Test

The rigid solid gel 210 was placed in the plugging permeability device. A heat jacket surrounding the plugging permeability device was set to a temperature of 200° F. A pressure of 500 psi (3.45 MPa) at 200° F. was applied gradually to the rigid solid gel 210 by injecting water through an inlet valve of the plugging permeability device by a hand pump. An outlet valve of the plugging permeability device was opened and a timer was set for 30 minutes. During the 30 minute time period, the pressure was further increased to 1500 psi (10.33 MPa). No water was observed at the outlet valve, indicating that the rigid solid gel 120 had completely blocked water flow through it. The plugging permeability apparatus was disassembled and the 3 mm slotted disc was observed. A filter cake was formed on the slotted disc, indicating that 3 mm aperture (equivalent to a simulated fracture) was sealed.

Figure 3:
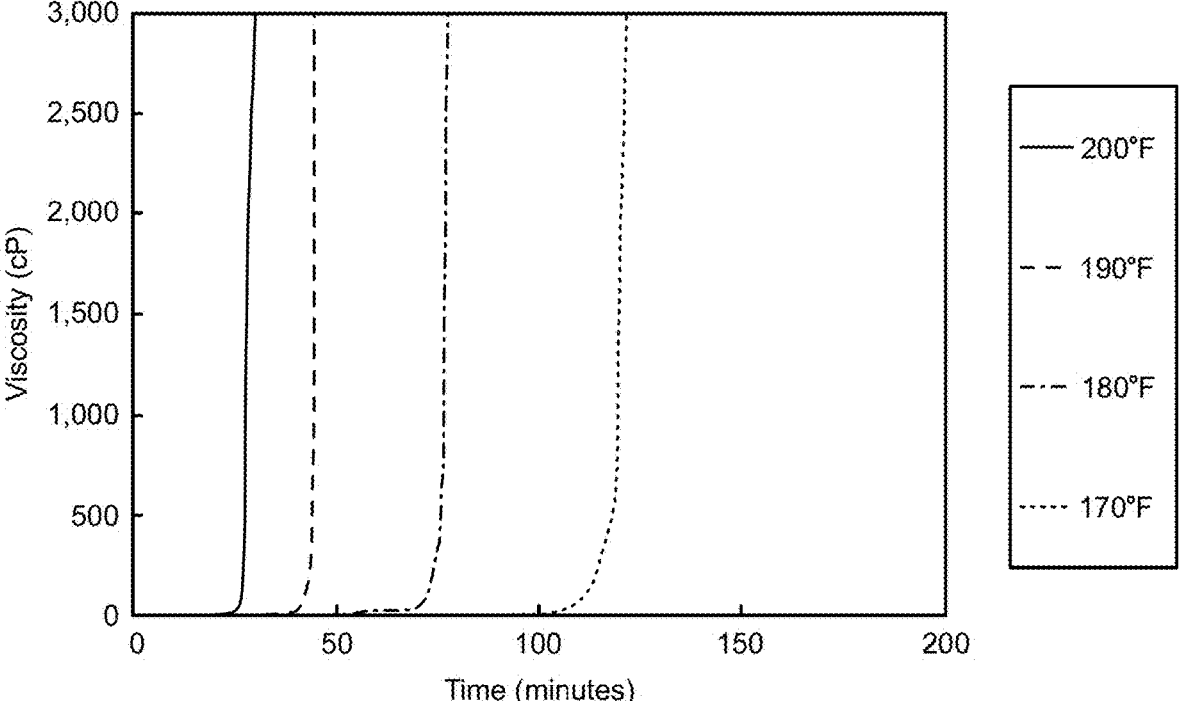
FIG. 3 is a graphical representation of the effect of temperature on the curing time to form the composite.

FIG. 3 is a graphical representation of the effect of temperature on the curing time to form the bio-composite sealant. The bio-composite solution (208 in FIG. 2) was evaluated at different temperatures to determine the curing time. The activator concentration in the composite solution was 30 wt %. At 170° F., the viscosity increased from 10 cp to 500 cP (an order of magnitude) in a time period of about 100 minutes. At 180° F., the viscosity increased from 10 cp to 500 cP in a time period of about 60 minutes. At 190° F., the viscosity increased from 10 cp to 500 cP in about 40-45 minutes, and at 200° F., viscosity increased from 10 cP to 500 cP in about 20-25 minutes.

FIG. 3 showed that as the temperature increased, the curing time decreased. The steep increase in viscosity indicated that a solid and rigid gel was formed after curing the bio-composite solution. Viscosity was measured using a rheometer equipped with a temperature sensor. The fixture used in the rheometer was a cylindrical cup. The viscosity of the cured bio-composite solution (solid gel) ranged between 100-3000 cP.

Figure 4:
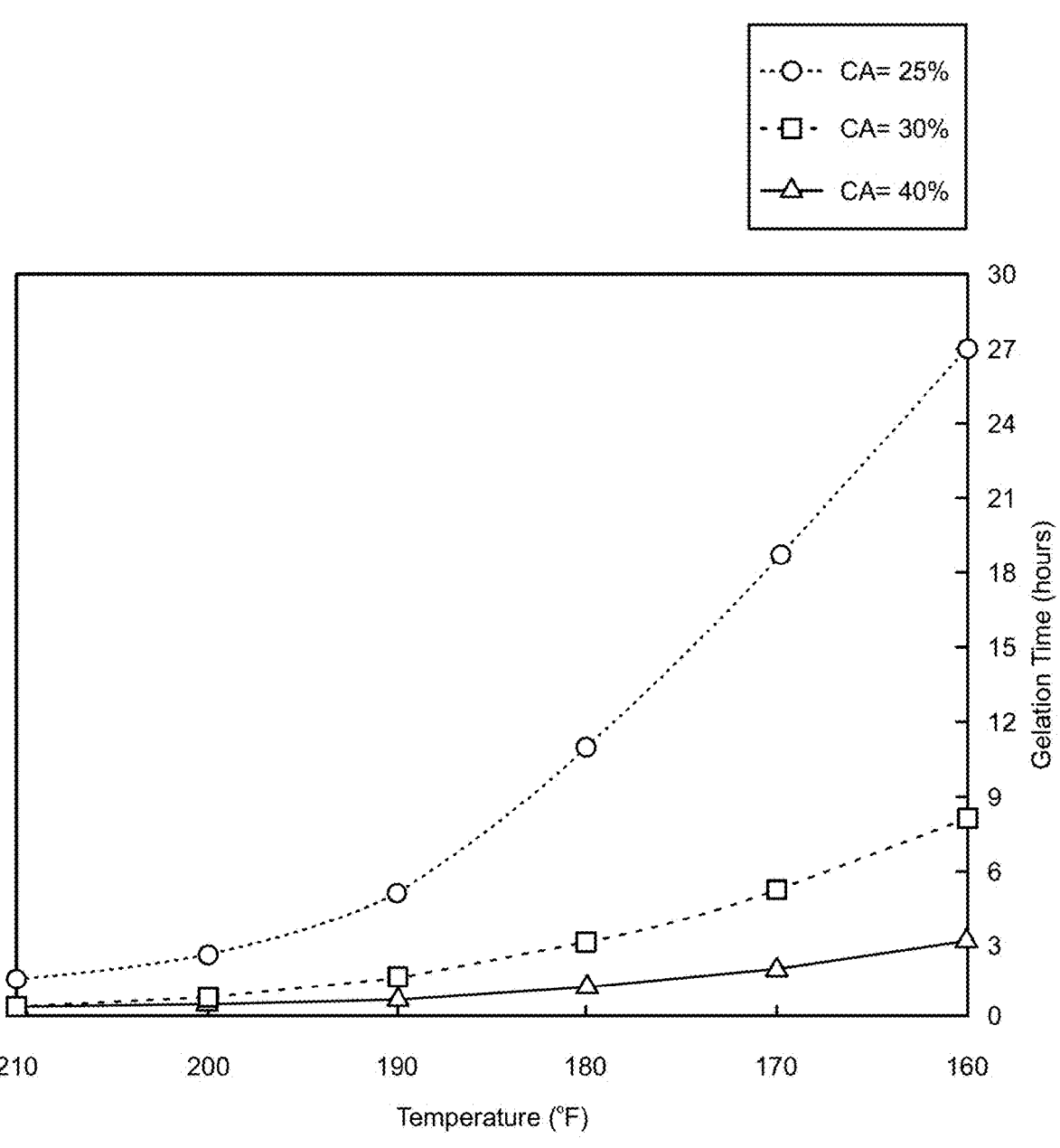
FIG. 4 is a graphical representation of the effect of activator concentration on curing time at a given temperature.

FIG. 4 is a graphical representation of the effect of activator concentration on curing time at a given temperature. The activator was added to the nanosilica solution at concentrations ranging from 25-40 wt % of the total volume of the combined nanosilica and activator solution. Crushed coffee waste was added to the mixture of nanosilica and activator solution. The curing time (time taken to form a solid gel) was determined by measuring the viscosity of the cured composite solution at the desired temperature and also by visually observing the bottle in which the solutions were prepared (bottle test).

The results in FIG. 4 showed that as the activator concentration increased, the curing time decreased. For example, at a temperature of 160° F. and activator concentration of 25 wt %, the time to cure the bio-composite solution was about 27 minutes. For the same temperature and activator concentrations of 30 wt % and 40 wt %, the time to cure the bio-composite solution was about 8 minutes and 3 minutes, respectively.

Similarly, at 200° F. and activator concentration of 25 wt %, the time to cure the composite solution was about 4 minutes. However, at the same temperature of 200° F. and activator concentrations of 30 wt % and 40 wt %, the time to cure the composite solution was about 2-3 minutes, which was not significantly different from the case when the activator concentration was 25 wt %. The results in FIG. 4 showed that an increase in both temperature and activator concentration resulted in decreasing the curing time of the composite solution. The activator concentration can be varied based on the target zone temperature. Based on the results of FIGS. 3 and 4, the activator concentration can be adjusted to increase or decrease the curing time based on the downhole conditions in a formation.

Figure 5:
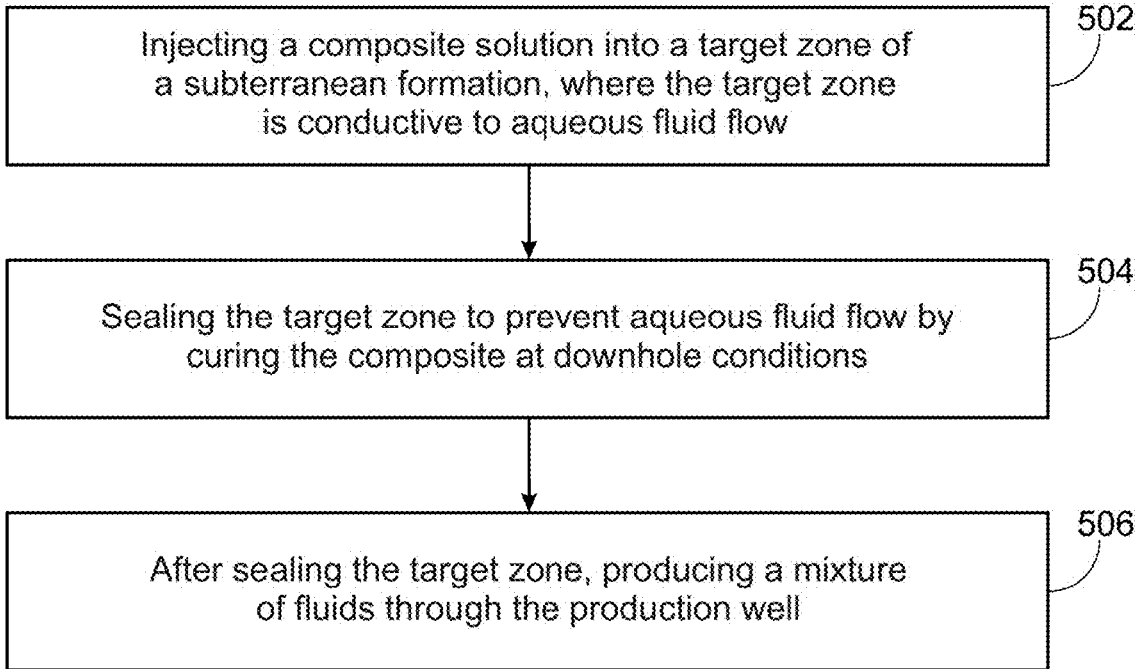
FIG. 5 is a process flow diagram of a method for water shut off in a production well using the composite solution.

FIG. 5 is a process flow diagram of a method for water shut off in a production well using a bio-composite solution. At block 502, a bio-composite solution is injected through coil-tubing or bull-heading into a target zone of an oil-bearing region in a subterranean formation. As described in FIG. 1A, the bio-composite includes colloidal nanosilica, an activator, and crushed coffee waste. The crushed coffee waste is porous and absorbs water from the solution, resulting in a bio-composite solution which has a viscosity of 50-200 cP at room temperature. The bio-composite solution flows into the target zone, as the target zone has a high permeability when compared to the surrounding reservoir rock. The target zone includes a fracture connected to an aquifer zone, which is highly conductive to water from the aquifer zone.

At block 504, after the injection of the bio-composite solution into the target zone, it is allowed to cure to form a solid gel inside the target zone, at downhole conditions. The temperature at downhole conditions can range between 150-350° F. During the bio-composite solution curing process, both the injection and production wells are shut off. As described in FIG. 2, the time taken for the bio-composite solution to form the solid gel is known as curing time. The factors that affect the curing time include temperature and concentration of the activator.

The solid gel occupies the volume space of the target zone and reduces water flow from the aquifer through the target zone. Therefore, the solid gel acts as an effective seal to prevent water flow through a target zone, such as a fracture, into the production well. The rigid solid gel is thermally stable at downhole conditions.

At block 506, after sealing the target zone, the production well produces a substantially high amount of hydrocarbon fluids and a reduced amount of water. In some implementations, only hydrocarbon fluids are produced with no water. The hydrocarbons include crude oil and dissolved gases. The bio-composite solution acts as an effective sealant for water shut off application in a fractured reservoir.

EXAMPLES

Certain aspects of the subject matter disclosed here can be implemented as a method for water shut off in a production well. The method includes injecting a composite solution which includes crushed coffee waste, colloidal nanosilica, and an activator into a target zone of a subterranean formation in which a hydrocarbon-producing production well is formed. The target zone is conductive to aqueous fluid that flow into the production well. The method includes sealing the target zone to prevent the flow of the aqueous fluid into the production well by curing the composite solution at downhole conditions, where the colloidal nanosilica reacts with the activator to form a solid gel interspersed with the crushed coffee waste. After sealing the target zone, a mixture of fluids is produced through the production well.

An aspect combinable with any other aspect includes the following features. The activator includes sodium silicate.

An aspect combinable with any other aspect includes the following features. The method of forming the solid gel includes adjusting a flow rate at which the composite solution is injected into the target zone to adjust a curing time of the composite solution at a downhole temperature. The curing time depends on a concentration of the activator.

An aspect combinable with any other aspect includes the following features. The method includes increasing the concentration of the activator to decrease the curing time of the composite solution.

An aspect combinable with any other aspect includes the following features. The method includes increasing the concentration of the activator to decrease the curing time of the composite solution at a downhole temperature, wherein the downhole temperature is about 150° F. or less.

An aspect combinable with any other aspect includes the following features. Increasing the concentration of the activator includes increasing the concentration from about 25 wt % to 40 wt % to decrease the curing time from about 30 minutes to 1 minute.

An aspect combinable with any other aspect includes the following features. Curing at the downhole temperature occurs at about 150-350° F.

An aspect combinable with any other aspect includes the following features. The curing time for the composite solution is about 50 minutes at 200° F. at a 30 wt % concentration of the activator.

An aspect combinable with any other aspect includes the following features. Curing the composite solution at downhole conditions includes shutting the production well for the duration of curing.

An aspect combinable with any other aspect includes the following features. The target zone includes a fracture, a vug, or void spaces connected to an aquifer zone.

Certain aspects of the subject matter disclosed here can be implemented as a composite. The composite includes a plurality of granular coffee waste, a colloidal nanosilica, and an activator. The activator includes sodium silicate.

An aspect combinable with any other aspect includes the following features. The colloidal nanosilica includes an active material of 40%.

An aspect combinable with any other aspect includes the following features. The concentration of the activator ranges between 20-40 wt %.

An aspect combinable with any other aspect includes the following features. The plurality of granular coffee waste is absorbent of a plurality of aqueous fluids.

An aspect combinable with any other aspect includes the following features. The plurality of granular coffee waste includes a size range of 200 microns to 5 mm.

An aspect combinable with any other aspect includes the following features. The viscosity ranges between 1-3000 centipoise (cP) at a temperature range of 170-200° F.

An aspect combinable with any other aspect includes the following features. The composite includes crushed date seed.

Certain aspects of the subject matter disclosed here can be implemented as a method for the formation of a composite. The method includes mixing a crushed coffee waste, a colloidal nanosilica, and an activator resulting in a composite solution, where the activator includes sodium silicate. The method includes forming a solid gel by curing the composite solution at a temperature of 150-350° F., where the colloidal nanosilica reacts with the activator to form the solid gel interspersed with the crushed coffee waste.

An aspect combinable with any other aspect includes the following features. The method further includes increasing a concentration of the activator to decrease the time to cure the composite solution, where the concentration of the activator ranges between 25-40 wt %.

Other implementations are also within the scope of the following claims.

The invention claimed is:

1. A method for water shut off in a production well, the method comprising:
   injecting a composite solution comprising crushed coffee waste, colloidal nanosilica, and an activator into a target zone of a subterranean formation in which a hydrocarbon-producing production well is formed, wherein the target zone is conductive to aqueous fluid into the production well;
   sealing the target zone to flow of the aqueous fluid into the production well by curing the composite solution at downhole conditions, wherein the colloidal nanosilica reacts with the activator to form a solid gel interspersed with the crushed coffee waste; and
   after sealing the target zone, producing a mixture of fluids through the production well.

2. The method of claim 1, wherein the activator comprises sodium silicate.

3. The method of claim 1, wherein forming the solid gel comprises:
   adjusting a flow rate at which the composite solution is injected into the target zone to adjust a curing time of the composite solution at a downhole temperature, wherein the curing time depends on a concentration of the activator.

4. The method of claim 3, further comprises increasing the concentration of the activator to decrease the curing time of the composite solution.

5. The method of claim 4, wherein increasing the concentration of the activator comprises increasing the concentration from about 25 weight (wt) % to 40 wt % to decrease the curing time from about 30 minutes to 1 minute.

6. The method of claim 3, further comprising increasing the concentration of the activator to decrease the curing time of the composite solution at a downhole temperature, wherein the downhole temperature is about 150 (Fahrenheit)° F. to 350° F.

7. The method of claim 3, wherein curing at the downhole temperature occurs at about 150-350° F.

8. The method of claim 3, wherein the curing time for the composite solution is about 50 minutes at 200° F. at a 30 wt % concentration of the activator.

9. The method of claim 1, wherein curing the composite solution at downhole conditions comprises shutting the production well for the duration of curing.

10. The method of claim 1, wherein the target zone comprises a fracture, a vug, or void spaces connected to an aquifer zone.

* * * * *